United States Patent [19]
Kerr

[11] Patent Number: 5,902,662
[45] Date of Patent: * May 11, 1999

[54] LAUNDERABLE FLOOR MAT WITH OZONE RESISTANCE

[75] Inventor: Robert C. Kerr, LaGrange, Ga.

[73] Assignee: Milliken & Company, Spartanburg, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/637,586

[22] Filed: Apr. 25, 1996

Related U.S. Application Data

[63] Continuation of application No. 08/296,756, Aug. 26, 1994, abandoned.

[51] Int. Cl.[6] .................................................. A47G 27/02
[52] U.S. Cl. ........................ 428/95; 428/314.8; 156/72; 156/78
[58] Field of Search ............................ 428/85, 95, 314.4, 428/314.8, 308.4; 156/72, 78

[56] References Cited

U.S. PATENT DOCUMENTS

| | | | |
|---|---|---|---|
| 3,306,808 | 2/1967 | Thompson et al. | 161/66 |
| 3,661,691 | 5/1972 | Slosberg | 161/67 |
| 3,949,123 | 4/1976 | Steel | 428/95 |
| 4,109,039 | 8/1978 | McCoy | 428/95 |
| 4,111,897 | 9/1978 | Black | 260/42.33 |
| 4,447,201 | 5/1984 | Knudsen | 425/397 |
| 4,716,618 | 1/1988 | Yasukawa et al. | 15/250.36 |
| 4,741,065 | 5/1988 | Parkins | 15/217 |
| 4,804,584 | 2/1989 | Nakashima et al. | 428/424.2 |
| 4,886,692 | 12/1989 | Kerr et al. | 428/82 |
| 4,917,932 | 4/1990 | McClung | 428/90 |
| 5,187,203 | 2/1993 | Lenox et al. | 521/75 |
| 5,227,214 | 7/1993 | Kerr et al. | 428/95 |
| 5,305,565 | 4/1994 | Nagahama et al. | 52/177 |

FOREIGN PATENT DOCUMENTS

| | | | |
|---|---|---|---|
| 513449 A1 | 11/1992 | European Pat. Off. | A47G 27/02 |
| 0 556 967 | 8/1993 | European Pat. Off. | A47G 27/02 |
| 58-152037 | 9/1983 | Japan | C08L 23/08 |
| A-58-219036 | 12/1983 | Japan . | |
| A-59-168048 | 9/1984 | Japan . | |
| 493272 | 11/1938 | United Kingdom . | |

*Primary Examiner*—Marion McCamish
*Assistant Examiner*—Elizabeth M. Cole
*Attorney, Agent, or Firm*—Terry T. Moyer; William S. Parks

[57] ABSTRACT

A lightweight dust control mat having enhanced resistance to oxidation and ozonation is provided. The mat includes a rubber backing sheet with a base rubber of NBR or SBR mixed with a polar polymer additive and a chemical blowing agent. The ratio of the base rubber to the polymer additive is between about 1.2 and 9. Following vulcanization, the rubber sheet has a specific gravity of less than about 0.98 and a Bayer ozone cracking incidence factor of 4 or less.

16 Claims, 2 Drawing Sheets

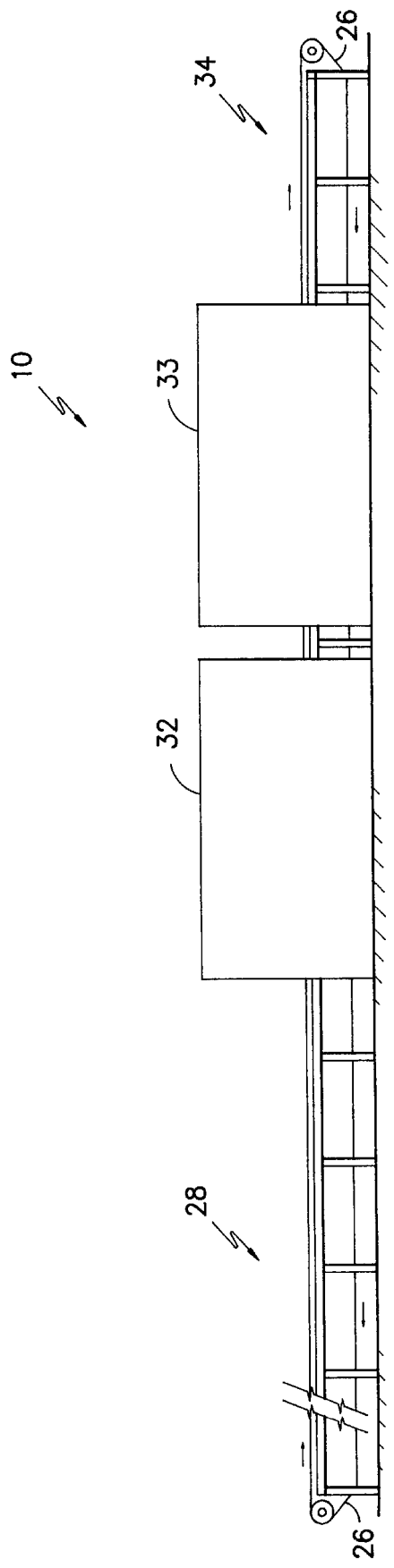

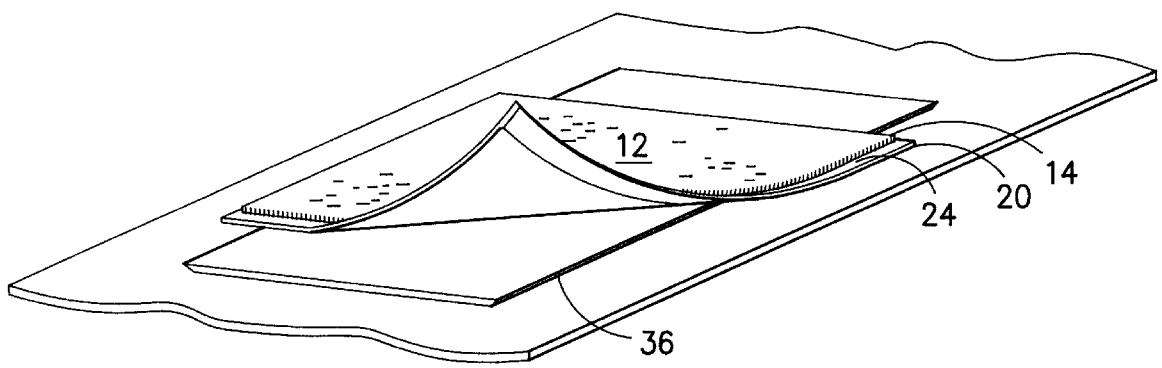
FIG. -2-
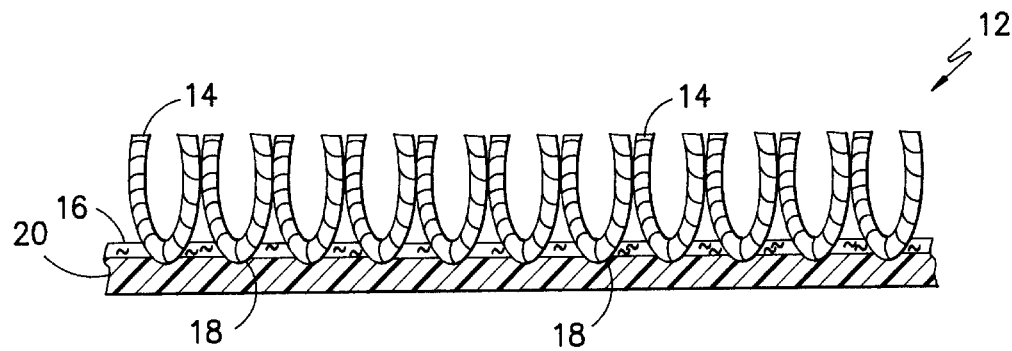
FIG. -3-

LAUNDERABLE FLOOR MAT WITH OZONE RESISTANCE

RELATED APPLICATIONS

This application is a continuation of prior application Ser. No. 08/296,756, Aug. 26, 1994, now abandoned.

FIELD OF THE INVENTION

The present invention relates generally to launderable rubber backed dust control floor mats of the type which have a pile surface on one side and a rubber or rubber-like material on the other side and more particularly to such floor mats wherein the rubber-like material is a low density compound of base rubber and a polar polymer additive such as polyvinyl chloride (PVC), or ethylene-propylene-diene (EPDM) yielding enhanced protection against deterioration due to oxidation and ozone attack during use and repeated washings and dryings.

BACKGROUND OF THE INVENTION

Dust control floor mats having a pile side and a rubber backing are generally used in access ways where people tend to brush or scrape their feet in order to prevent carrying moisture and/or dirt into other areas of the premises. Normally these mats are located in areas of high pedestrian traffic such as doorways.

The art includes a number of configurations and features for various floor mats. Some patents which are believed to be illustrative of known mats include U.S. Pat. Nos. 3,306,808 to Thompson, et al. issued Feb. 28, 1967; 4,741,065 to Parkins issued May 3, 1988; 4,886,692 to Kerr et al. issued Dec. 12, 1989; 5,227,214 to Kerr et al. issued Jul. 13, 1993; and 5,305,565 to Nagahama et al. issued Apr. 26, 1994; the teachings of all of which are incorporated herein by reference.

As will be appreciated, dust control mats by their nature must undergo frequent repeated washings and dryings so as to remove the dust deposited during use. These mats are generally rented from service entities which retrieve the soiled mats from the user and provide clean replacement mats on a frequent basis. The soiled mats are thereafter cleaned and dried in an industrial laundering process and then sent to another user in replacement of newly soiled mats.

Dust control mats have had two significant problems arising from frequent washings and harsh environments of use. First, the energy required to wash and dry a typical floor mat is significant due to the overall mass of the mats. This overall mass is made up of the mass of the mat pile, the mass of the carrier fabric into which the mat pile is tufted, and most significantly, the mass of the rubber backing sheet which is integrated to the carrier fabric under heat and pressure. As will be appreciated, a reduction in the overall mass of the floor mat will result in a reduced energy requirement in washing and drying the mat. Moreover, a relative reduction in the mass of the rubber backing sheet (i.e. the heaviest component) will provide the most substantial benefit. The floor mat of the present invention includes a rubber backing sheet which has a specific gravity which is approximately 25 percent less then the rubber sheets of typical prior floor mats. Accordingly, the overall energy requirements associated with the cleaning and handling of these mats is substantially reduced over that of prior mats.

The second problem which is encountered is the deterioration of the carbon—carbon double bonds in the matrix of the rubber backing sheet due to the exposure of the sheets to an oxidizing environment during use and cleaning. Specifically, the exposure of the mats to oxidizing agents during the washing and drying process tends to cleave the carbon—carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking over time. The mat of the present invention incorporates a rubber backing sheet which provides enhanced protection against oxygen as measured by standard ozone resistance tests and is thereby believed to substantially prolong the useful life of the mat. Accordingly, the mat of the present invention represents a useful advancement over the prior art.

OBJECTS AND SUMMARY OF THE INVENTION

It is a general object of the present invention to provide a dust control mat having enhanced resistance to oxidation and ozone attack.

It is a further object of the present invention to provide a dust control mat having a low density rubber backing sheet.

In that respect, it is a general feature of the present invention to provide a dust control mat including a backing sheet of base rubber mixed with a polymer additive and a chemical blowing agent to produce a stable lightweight mat with enhanced resistance to oxygen and ozone attack.

It is a specific feature of the present invention to provide a dust control mat including a backing sheet of acrylonitrile-butadiene rubber (NBR) mixed with either polyvinyl chloride (PVC) or ethylene-propylene-diene (EPDM) or a backing sheet of styrene butadiene rubber (SBR) mixed with EPDM and including a chemical blowing agent.

It is a further feature of the present invention to provide a dust control mat including a vulcanized expanded backing sheet of NBR mixed with PVC or EPDM and a blowing agent wherein the specific gravity of the resultant vulcanized expanded backing sheet is less than about 0.98.

It is a further feature of the present invention to provide a dust control mat including a vulcanized expanded backing sheet of SBR mixed with EPDM and a blowing agent wherein the specific gravity of the resultant vulcanized expanded backing sheet is less than about 0.98.

It is a more particular feature of the present invention to provide a dust control mat including a vulcanized expanded backing sheet of NBR mixed with PVC wherein ratio of NBR to PVC in the backing sheet is between about 1.2 and about 9.

It is another particular feature of the present invention to provide a dust control mat including a vulcanized expanded backing sheet of NBR mixed with EPDM wherein the ratio of NBR to EPDM in the backing sheet is between about 1.2 and about 9.

It is still another particular feature of the present invention to provide a dust control mat including a vulcanized expanded backing sheet of SBR mixed with EPDM wherein the ratio of SBR to EPDM in the backing sheet is between about 1.2 and about 9.

It is yet a further feature of the present invention to provide dust control mat including a vulcanized expanded backing sheet which has an ozonation cracking incidence factor of about 4 or less as measured according to the Bayer Ozone Resistance Test.

In one aspect of the present invention, a dust control mat is provided. The dust control mat includes a carrier fabric; a pile material tufted into the carrier fabric which forms a pile surface on one side of the carrier fabric and a vulcanized expanded backing sheet of rubber integrated to the other side of the carrier fabric. If NBR is used as the base rubber for the backing sheet, the NBR is mixed with polyvinyl chloride (PVC) or ethylene-propylene-diene (EPDM) and undergoes chemical blowing during vulcanization to yield a two phase (gas/solid) closed cell structure having a specific gravity of less than about 0.98. If SBR is used for the base rubber of the backing sheet, the SBR is mixed with EPDM and undergoes chemical blowing during vulcanization to yield a two phase (gas/solid) closed cell structure having a specific gravity of less than about 0.98. The Bayer ozonation cracking incidence factor of the backing sheet after vulcanization is four (4) or less.

BRIEF DESCRIPTION OF THE DRAWINGS

FIG. 1 is a schematic representation of a floor mat manufacturing machine.

FIG. 2 illustrates a molded floor mat as it exists the mat manufacturing machine of FIG. 1.

FIG. 3 is a partial cross-sectional view of a completed vulcanized floor mat.

DETAILED DESCRIPTION

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

Turning now to the drawings wherein like elements are designated by like reference numerals in the various views, in FIG. 1 is shown a schematic of a floor mat manufacturing machine 10 for producing the floor mat 12 (FIGS. 2 and 3) of the present invention. In the illustrated and preferred form of the invention, the floor mat 12 includes pile yarns 14 of cotton nylon, polyester or other suitable material tufted through a woven or nonwoven carrier layer 16 of suitable material with the bottom 18 of the tufts adhered to a rubber backing sheet 20. This adherence of the rubber backing sheet 20 to the carrier layer 16 and bottom of the tufts is effected during vulcanization (i.e. cross-linking) of the rubber backing sheet under heat and pressure as is well known to those of skill in the art. If desired, the bottom of the rubber backing sheet may also includes a plurality of anti-creep cleats (not shown) as are well known to those in the art. As shown in FIG. 2, the floor mat 12 of the present invention also preferably includes a border portion 24 around the perimeter.

The floor mat 12 of the present invention is assembled molded and vulcanized on the manufacturing machine 10 of FIG. 1. The manufacturing machine 10 which is well known to those of skill in the art includes an endless, teflon coated conveyor belt 26 to carry the floor mats 12 from an assembly station 28, into a press molding apparatus 32, to a post cure oven 33 and out to a separating station 34. The press molding apparatus 32 can be of any type which is suitable such as that shown in U.S. Pat. No. 4,447,201 to Knudsen (incorporated by reference).

In production of the dust control mats 12 of the present invention, the mats are preassembled at station 28 by laying down a metal plate or silicone or butyl pad 36 on the conveyor belt 26. The rubber backing sheet 20 as described more fully below is placed over the silicone pad and the tufted fabric comprising the pile yarns 14 tufted through the carrier layer 16 is placed on top of the rubber backing sheet 20. In the preferred practice, the rubber backing sheet laid down at the assembly station 28 is a solid calendared sheet of green (i.e. unvulcanized) acrylonitrile-butadiene rubber (NBR) or styrene butadiene rubber (SBR) mixed with a polymer additive such that the ratio of the NBR or SBR to the polymer additive is between about 1.2 and 9. By way of example only and not limitation, if NBR is the base material for the rubber backing sheet, the potentially preferred polymer additive is polyvinyl chloride (PVC) or ethylene-propylene-diene (EPDM). If SBR is the base material for the rubber backing sheet, EPDM is the preferred polymer additive.

The conveyor belt 26 is then indexed to place the preassembled mat into the press mold 32 while a second mat is preassembled at station 28. While the first mat is in the press mold 32, it is exposed to a temperature between about 300° F. and about 340° F. While in the press mold 32, the mat is exposed to pressures in the range of between about 20 psi and 40 psi. At the temperature and pressure occurring in the press mold 32, the rubber backing sheet 20 undergoes vulcanization and is integrated to the carrier layer 16 of the mat to form a substantially unitary structure. After about 3 to 6 minutes the conveyor belt 26 is again indexed to move the first vulcanized mat into a post cure oven 33 to complete the vulcanization but without the application of pressure. During this time yet a third mat is preassembled at station 28 while the second mat is indexed to the press mold.

In the preferred practice, the post cure oven is operated at a temperature between about 300° F. and 340° F. but no pressure is applied to the mat. After another 3 to 6 minutes, the conveyor belt is again indexed to move the first mat into the stripping station 34 wherein it is removed from the silicone pad and the conveyor belt 26 (FIG. 2) while the second, and third mats are indexed into the post cure oven 33, and the press mold 32 respectively, and a fourth mat is preassembled at station 28. As will be appreciated, the mat may also undergo a preheating operation prior to entering the press mold if desired as described in my U.S. Pat. No. 4,886,692.

As previously indicated, in the preferred embodiment of the present invention the base material for the rubber backing sheet 20 is acrylonitrile-butadiene rubber (NBR) or styrene-butadiene rubber (SBR). Other materials which may also be used include, by way of example, hydrogenated NBR and carboxylated NBR although the use of these materials may be cost prohibitive. As will be appreciated, the use of NBR or SBR is desirable from a cost perspective. However, these materials may be susceptible to oxidation and ozone attack (referred to as ozonation) due to the presence of unsaturated carbon—carbon double bonds. Moreover, the specific gravity of fully vulcanized NBR or SBR compositions is relatively high being in the range of about 1.2 to about 1.45 which may result in a relatively heavier overall mat structure.

The present invention makes use of fluxing technology to combine polar polymer materials in formation of the rubber backing sheet 20 to provide enhanced resistance to oxidation and ozonation while at the same time yielding a lighter material through the addition of chemical blowing agents. These blowing agents, when combined with the rubber materials, ultimately form, upon vulcanization, a foam rubber mat backing which has, as noted above, a specific gravity of not greater than 0.98. Specifically, in the preferred embodiment, the rubber backing sheet 20 of the present invention comprises either NBR mixed with PVC or EPDM and a blowing agent in a fluxing operation or SBR mixed with EPDM and a blowing agent in a fluxing operation wherein the PVC or EPDM is mixed at a level such that the ratio of the base rubber (NBR or SBR) to the polymer additive (PVC or EPDM) is between about 1.2 (i.e. 55 parts base rubber and 45 parts polymer additive) and about 9.0 (i.e. 90 parts primary polymer and 10 parts polymer additive). This fluxing operation preferably takes place in a standard rubber internal mixer such as a Banbury mixer which is well known to those of skill in the art. When NBR is fluxed with PVC the mixer is preferably operated at a temperature of between about 330° F. to 340° F. When NBR or SBR is fluxed with EPDM, the mixer is preferably operated at a slightly lower temperature of about 280° F. to 300° F. due to EPDM's thermoplastic nature.

The rubber mixture is thereafter calendered as a solid sheet of unvulcanized material which is used in the manufacture of the floor mat 12 in the process as described above. In practice, the raw NBR is believed to be available from Miles Inc. Rubber Division in Akron, Ohio. The SBR may be purchased from Goodyear Tire and Rubber Company in Akron Ohio. The PVC may be purchased in pellet form from Goodyear Tire and Rubber Company in Akron Ohio. The EPDM may be purchased from Exxon Corporation under the trade designation Vistalon™.

In the preferred practice of the present invention, a masterbatch of the polymer components is first prepared by mixing the base rubber (either NBR or SBR) with the additive polymer (either PVC or EPDM) in the desired ratio along with various stabilizers and processing agents. Exemplary compositions of the masterbatch for various additive ratios wherein PVC or EPDM is mixed with NBR are provided in Table 1A for ratios of NBR to the additive polymer of 9.0 (Column a), 2.3 (Column b) and 1.2 (Column c).

TABLE 1A

| MATERIAL | PARTS BY WEIGHT | | |
|---|---|---|---|
| | a | b | c |
| Rubber (NBR) | 90 | 70 | 55 |
| Additive Polymer (PVC or EPDM) | 10 | 30 | 45 |
| Plasticizer | 5 | 10 | 15 |
| Stabilizer | 2 | 2 | 2 |
| Processing Aid | 1.75 | 1.75 | 1.75 |
| Antioxidant | 1.2 | 1.2 | 1.2 |

In the preferred practice the plasticizer which is used is diisononylphthalate. The stabilizer is trinonylphenolphosphate available from Uniroyal Chemical under the trade designation Polyguard™. The processing aid is purchased from the R. T. Vanderbilt Company in Norwalk Connecticut under the trade designation Vanfree™ AP-2. The antioxidant is purchased from Uniroyal Chemical under the trade designation Octamine™.

Following the mixing of the masterbatch, curative agents are added in a second stage mixing process for formation of the raw rubber compound which forms the backing sheet 20 of the mat 12 of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Exemplary compositions of the masterbatch for various additive ratios of SBR to EPDM are provided in Table 2A in a manner similar to that of Table 1A.

TABLE 2A

| MATERIAL | PARTS BY WEIGHT | | |
|---|---|---|---|
| | a | b | c |
| Rubber (SBR) | 90 | 70 | 55 |
| Additive Polymer (EPDM) | 10 | 30 | 45 |
| Stearic Acid | 1 | 1 | 1 |
| Sunolite 240 | 2 | 2 | 2 |
| Zinc Oxide | 5 | 5 | 5 |
| Carbon Black N-550 | 30 | 30 | 30 |
| Carbon Black N-224 | 60 | 60 | 60 |
| Calcium Carbonate | 35 | 35 | 35 |
| Talc | 30 | 30 | 30 |
| Supar 2280 | 80 | 80 | 80 |

After mixing of the SBR masterbatch, curative agents are preferably added in a second stage mixing process for formation of the raw rubber compound which forms the backing sheet 20 of the mat 12 of the present invention. An exemplary composition of the raw rubber compound formed in this second stage mixing process is provided in Table 2B.

TABLE 2B

| MATERIAL | PARTS BY WEIGHT |
|---|---|
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the rubber backing sheet 20 preferably includes a blowing agent to effect the formation of closed gas cells in the rubber during vulcanization. The blowing agent which is preferably used is a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen™ AZ-type blowing agents) available from Uniroyal Chemical Inc. in Middlebury Conn. and modified azodicarbonamide available from Miles Chemical in Akron, Ohio under the trade designation Porofor™ ADC-K.

It has been found that the addition of such blowing agents at a level of between about 1 and about 5 parts by weight in the raw rubber composition yields a rubber sheet having an expansion factor of between about 50 and 200 percent. It has been further found that this expansion using these materials yields a final vulcanized rubber backing sheet having a specific gravity of less than about 0.98 and preferably between about 0.5 and about 0.98.

After the fluxing processes are completed, the uncured rubber compound containing PVC and/or EPDM and the blowing agent is assembled with the pile yarns 14 and carrier layer as previously described. The vulcanization of the rubber backing sheet is then at least partially effected within the press molding apparatus 32 wherein the applied pressure is between 20 and 40 psi. Under the high temperatures and pressure, the nitrogen which is formed by the blowing agent partly dissolves in the rubber. Due to the high internal gas pressure, small closed gas cells are formed within the structure as the pressure is relieved upon exit from the press molding apparatus. In the preferred practice the post cure oven 33 is used to complete the vulcanization of the mat and provide additional stability to the resulting product.

As previously indicated, a primary object of the present invention is to provide enhanced resistance to oxidation and ozonation which tend to weaken the carbon—carbon double bonds in the rubber. As will be appreciated, standardized tests may be used to evaluate the ozone resistance of a rubber compound formulation. The general procedure for conducting such tests is set forth in standards such as ASTM Standard D 518 entitled "Test Method for Rubber Deterioration—Surface Cracking;" D 1149 entitled "Test Method for Rubber Deterioration—Surface Ozone Cracking in a Chamber" and D 3395 entitled "Test Method for Rubber Deterioration—Dynamic Ozone Cracking in a Chamber" published in Annual Book of ASTM Standards, Vol. 09.01, 1992.

The Bayer method ozone resistance test utilizes methods and equipment as described in ASTM Standard D 1149 and yields a quantitative cracking incidence factor as well as crack length factor. Specifically, in the Bayer method ozone resistance test cured slabs of the test material are cut into sections 55×45×4 mm for mounting on a loop mold. In a chamber, the specimens are then subjected to a controlled atmosphere of ozone at a partial pressure of approximately 50 mPa (pphm) in air. Both the number and average length of the cracks occurring in the rubber is then observed. Based on this observation, the sample is then assigned a rating comprising two numbers. The first number identifies the incidence of cracking while the second number identifies the length of the cracks as based on the following scale:

| BAYER METHOD SCALE | | | |
|---|---|---|---|
| FIRST NUMBER (Bayer Cracking Incidence Factor) | NUMBER OF CRACKS | SECOND NUMBER | LENGTH OF CRACKS (Bayer Crack Length Factor) |
| 0 | No Cracking | 0 | No Cracks |
| 1 | 1–2 Cracks | 1 | Just Visible |
| 2 | 3–9 Cracks | 2 | 1 mm |
| 3 | 10–24 Cracks | 3 | 2 mm |
| 4 | 25–79 Cracks | 4 | Greater than 2 mm |
| 5 | 80–250 Cracks | | |
| 6 | More than 250 cracks | | |

Accordingly, a sample rating of 3/2 would indicate the occupance of 10 to 24 cracks with an average length of 1 mm.

EXAMPLE

A rubber sheet material was produced by fluxing together the materials as set forth in Table 1A in a standard rubber internal mixer at a temperature of about 330° F. to 340° F. for a period of one to two minutes. PVC additions were varied as shown in Table 1A to yield ratios of NBR to PVC of 9.0 (90 parts NBR to 10 parts PVC); 2.33 (70 parts NBR to 30 parts PVC); and 1.22 (55 parts NBR to 45 parts PVC). Additions of curative agents as provided in Table 1B were then made. Uncured sheets of the fluxed rubber compounds were then calendered and cured at a temperature of about 325° F. for five (5) minutes under a pressure of about 40 psi and post cured at a temperature of about 325° F. at atmospheric pressure for a period of five (5) minutes. Sample strips of the cured rubber sheets were then subjected to the Bayer Ozone Resistance Test with a 20% extension with samples being subjected to an ozone partial pressure of 50 mPa (pphm) in air for a period of 24 hours. The results of these tests as compared to comparative tests on fully cured NBR without a polar additive such as PVC or EPDM are set forth in Table 2.

TABLE 2

| SAMPLE | ADDITIVE RATIO NBR/PVC | BAYER CRACKING INCIDENCE FACTOR | BAYER CRACK LENGTH FACTOR |
|---|---|---|---|
| 1 | Standard NBR | 6 | 4 |
| 2 | 9.0 | 4 | 3 |
| 3 | 2.33 | 2 | 1 |
| 4 | 1.22 | 0 | 0 |

While specific embodiments and practices have been illustrated and described in accordance with the present invention, it is to be understood that the invention is not limited thereto, since modifications may be made and other embodiments of the principles of this invention will occur to those skilled in the art to which this invention pertains. Therefore, it is intended to cover any such modifications and other embodiments as incorporate the features of the present invention within the true spirit and scope of the following claims.

What is claimed is:

1. A dust control mat suitable for multiple washings and dryings comprising
    a carrier fabric;
    a pile material tufted into the carrier fabric forming a pile surface extending from one side of the carrier fabric; and
    a rubber sheet comprising
        a base rubber being NBR;
        a polymer ozone-resistance additive being EPDM; and
        a chemical blowing agent; wherein
            the ratio of base rubber to polymer ozone-resistance additive is from 1.2 to 9;
            the rubber sheet is integrated with the carrier fabric on the side of the carrier fabric from which the pile surface does not extend;
            the rubber sheet is vulcanized under heat and pressure; and
        the resultant foam rubber sheet has a specific gravity of not greater than 0.98 and a Bayer ozone cracking incidence factor of 4 or less.
2. The dust mat in claim 1 wherein
    the resultant foam rubber sheet has a Bayer cracking incidence factor of 3 or less.

3. The dust mat in claim 1 wherein
the resultant foam rubber sheet has an expansion factor of between about 50 and 200 percent.

4. The dust mat in claim 3 wherein
the resultant foam rubber sheet has a specific gravity of between 0.5 and 0.98.

5. The dust mat in claim 3 wherein
the chemical blowing agent is an organic nitrogen compound yielding a closed cell structure in the resultant foam rubber sheet.

6. The dust mat in claim 1 wherein
the ratio of NBR to EPDM is between about 2.3 and 9.

7. A dust control mat suitable for multiple washings and dryings comprising
   a carrier fabric;
   a pile material tufted into the carrier fabric forming a pile surface extending from one side of the carrier fabric; and
   a rubber sheet comprising
      a base rubber being SBR;
      a polymer ozone-resistance additive being EPDM; and
      a chemical blowing agent; wherein
         the ratio of base rubber to polymer ozone-resistance additive is from 1.2 to 9;
         the rubber sheet is integrated with the carrier fabric on the side of the carrier fabric from which the pile surface does not extend;
         the rubber sheet is vulcanized under heat and pressure; and
         the resultant foam rubber sheet has a specific gravity of not greater than 0.98 and a Bayer ozone cracking incidence factor of 4 or less.

8. The dust mat in claim 1 wherein
the resultant foam rubber sheet has a Bayer cracking incidence factor of 3 or less.

9. The dust mat in claim 7 wherein
the resultant foam rubber sheet has an expansion factor of between about 50 and 200 percent.

10. The dust mat in claim 9 wherein
the resultant foam rubber sheet has a specific gravity of between 0.5 and 0.98.

11. The dust mat in claim 9 wherein
the chemical blowing agent is an organic nitrogen compound yielding a closed cell structure in the resultant foam rubber sheet.

12. The dust mat in claim 7 wherein
the ratio of SBR to EPDM is between about 2.3 and 9.

13. A method of forming a dust control mat suitable for multiple washings and dryings comprising the steps of
   (a) tufting a pile material into a carrier fabric to form a tufted pile surface extending from one side of the carrier fabric;
   (b) laying the carrier fabric with tufted pile onto a solid rubber sheet comprising
      a base rubber selected from the group consisting of NBR and SBR;
      a polymer ozone-resistance additive being EPDM; and
      a chemical blowing agent; wherein
         the ratio of base rubber to polymer ozone-resistance additive is between about 1.2 and 9; and
   (c) integrating the rubber sheet under heat and pressure to the side of the carrier fabric from which the pile surface does not extend to form an integrated mat structure, wherein the resultant rubber sheet is in a foam state.

14. The method of claim 13 wherein
during step (c), the chemical blowing agent is activated to expand the rubber sheet by 50 to 200 percent.

15. The method of claim 13 wherein
the base rubber is NBR and the ratio of NBR to EPDM is between about 2.3 and 9.

16. The method of claim 13 wherein
the base rubber is SBR and the ratio of SBR to EPDM is between about 2.3 and 9.

* * * * *